Dec. 12, 1950     C. S. ASH     2,533,707
VEHICLE WHEEL

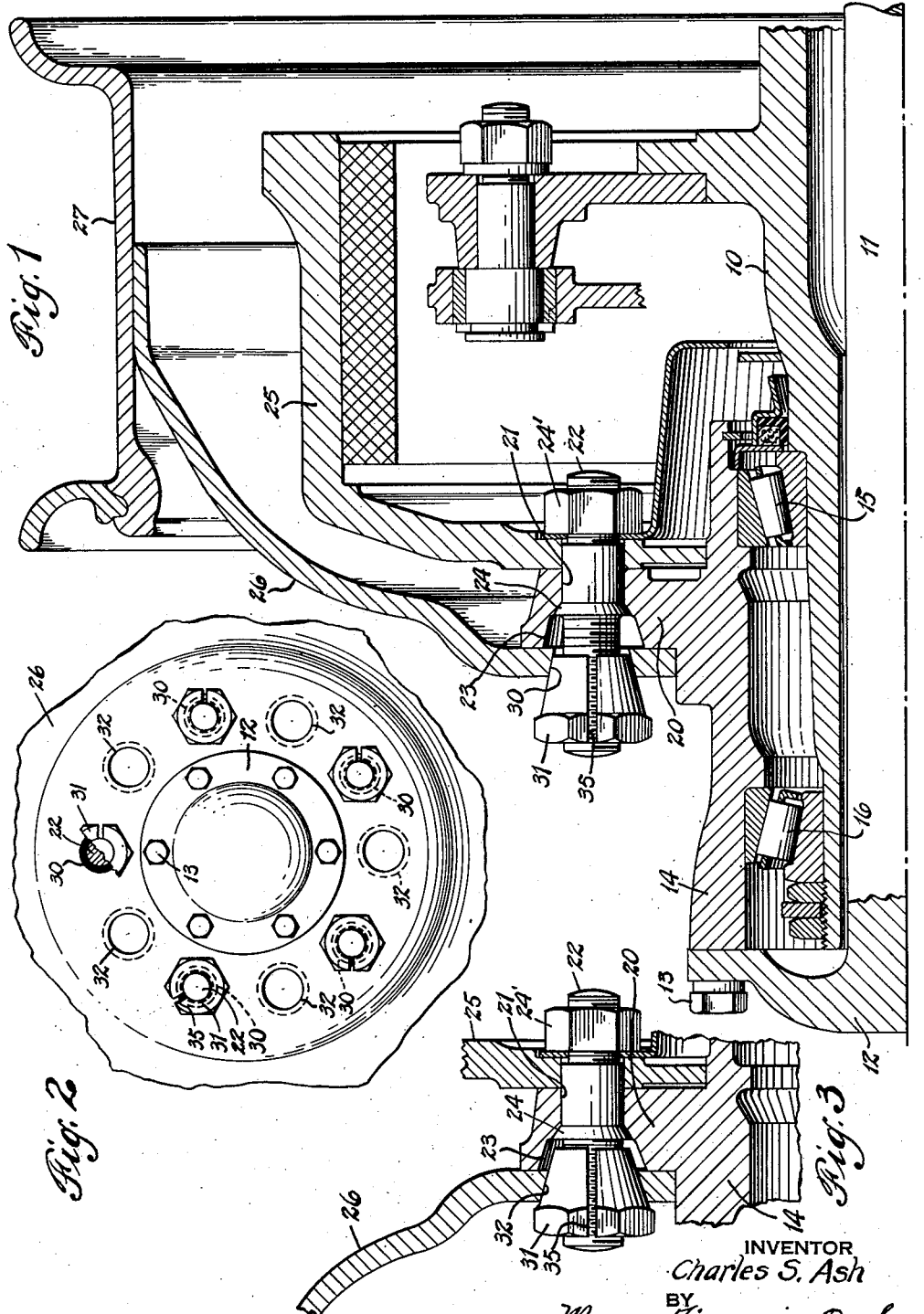

Filed Nov. 30, 1946     2 Sheets-Sheet 2

INVENTOR
Charles S. Ash
BY
Morgan, Finnegan & Durham
ATTORNEYS

Patented Dec. 12, 1950

2,533,707

UNITED STATES PATENT OFFICE 2,533,707

VEHICLE WHEEL

Charles S. Ash, Milford, Mich.

Application November 30, 1946, Serial No. 713,369

8 Claims. (Cl. 301—9)

The present invention relates to a novel and improved vehicle wheel and is particularly applicable to wheels for heavy duty vehicles, although not limited thereto.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

This application is a continuation in part of my copending application Serial Number 561,024 filed October 30, 1944, now abandoned.

The accompanying drawings, referred to herein and constituting a part hereof, illustrate one embodiment of the invention, and together with the description, serve to explain the principles of the invention.

It is an object of the present invention to provide an improved wheel for vehicles and particularly for vehicles adapted to carry heavy loads such as trucks. Another object of the invention is the provision of a demountable at the hub type of vehicle wheel which is dished and may be mounted in either outwardly or inwardly dished position on the wheel hub with the same mounting means and with equal security. The invention further provides a vehicle wheel which is simple and economical to construct but which affords maximum security when mounted on the vehicle, and, further, a wheel of such characteristics which may be utilized in dual wheel assemblies and may occupy, without structural change, either the inboard or outboard position. Still another object of the invention is the provision of a wheel which may be mounted in any position on the vehicle with perfect security and in a simple manner, without recourse to right and left hand threads at opposite sides of the vehicle and other complicated and costly devices for tightly mounting wheels.

Of the drawings:

Fig. 1 is a vertical cross sectional view of a vehicle rear axle and hub having mounted thereon an inwardly dished wheel in accordance with the present invention;

Fig. 2 is an end view of the wheel and hub assemblies shown in Fig. 1 with certain nuts and bolts omitted;

Fig. 3 is a fragmentary cross sectional view of the wheel hub shown in Fig. 1 the wheel being mounted thereon in outwardly dished position.

Figure 4:
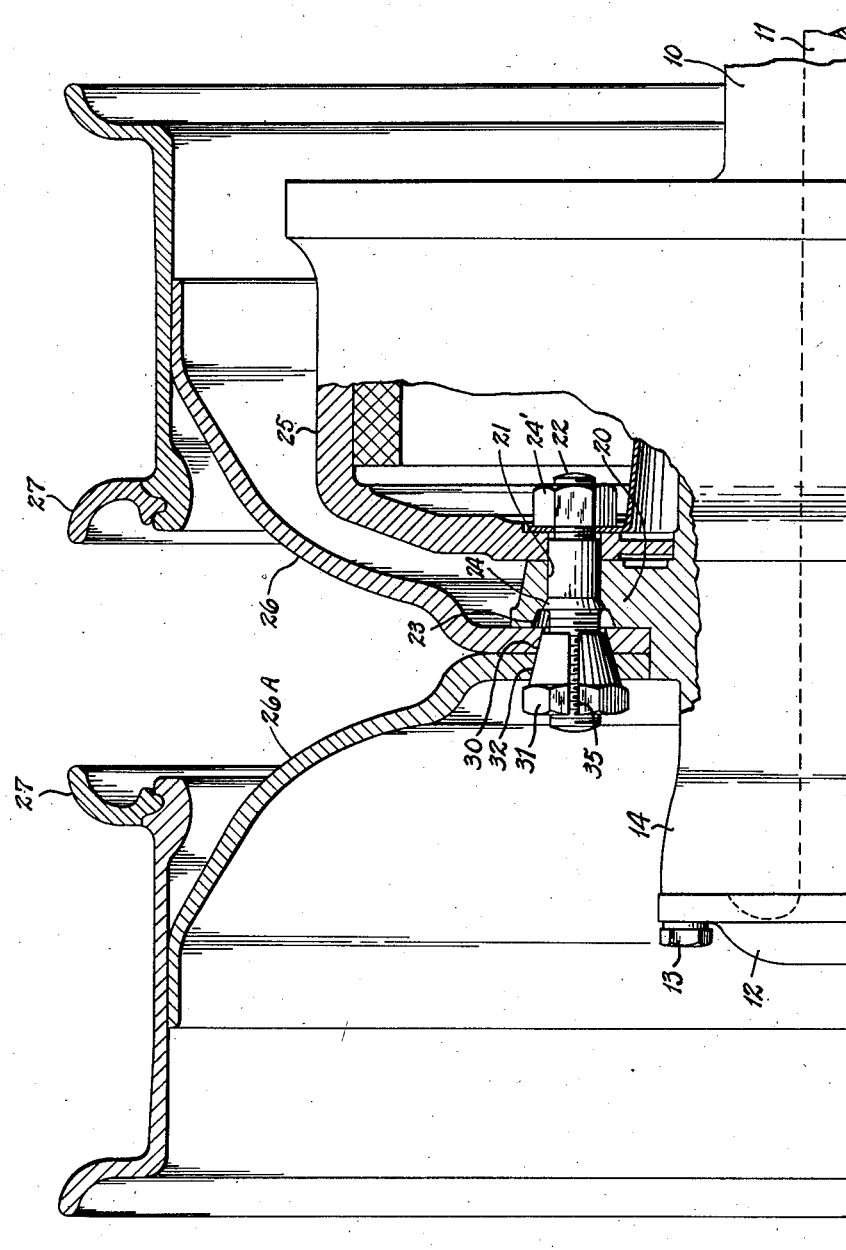
Fig. 4 is a vertical cross-sectional view of a vehicle rear axle and hub assembly having dual wheels mounted thereon in accordance with the present invention.

Referring now in detail to the illustrative embodiment of the present invention as shown by way of example in the accompanying drawings, and referring first to Fig. 1, the vehicle wheel is shown mounted on the rear axle 10 of a vehicle having the drive shaft 11 within the axle. Shaft 11 is connected by means of an integral end flange 12 and bolts 13 to drive the cylindrical hub member 14 which is mounted for rotation on the reduced end of axle 10 by means of tapered roller bearings 15 and 16.

The embodied means for mounting a wheel on hub 14 comprise an integral outwardly radially extending flange 20 on the hub having a plurality of circumferentially spaced apart apertures 21 to receive wheel mounting bolts 22. Flange 20 at its outer face around apertures 21 is substantially frusto-conically counter-sunk as at 23 for purposes hereinafter mentioned, and mounting bolts 22 are frusto-conically flared as at 24 and seated at the bottom of the recesses 23. Nuts 24' are threaded on the opposite ends of bolts 22 to firmly secure them in apertures 21, and serve also to hold conventional brake drums 25 in place against flange 20.

The wheel 26 mounted on hub 14 is of the dished web demountable at the hub type and carries at its outer periphery a conventional pneumatic tire mounting rim 27. As shown in Fig. 2, wheel 26 is adapted to be mounted on hub 14 in either inwardly dished position as it is shown in Fig. 1, or in outwardly dished position as it is shown in Fig. 3. For this purpose the wheel is provided with a plurality of apertures circumferentially spaced apart adjacent the inner periphery of the web to receive the wheel mounting bolts 22 when the wheel is mounted on hub 14. There are double the number of apertures provided through the web of wheel 26 as there are mounting bolts 22, and the apertures are so spaced apart that bolts 22 will fit through alternate apertures when the wheel is in place. The web apertures are provided with tapered walls for engagement with frusto-conically formed wheel mounting nuts, and each aperture is tapered oppositely to the apertures on either side, whereby the wheel may be mounted in inwardly dished position using one series of alternate apertures to receive bolts 22, or may be mounted in outwardly dished position using the other series of alternate apertures.

In Fig. 1 wheel 26 is shown having apertures 30 receiving bolts 22, and the apertures have inwardly tapering walls against which are seated the outer surfaces of frusto-conical mounting nuts 31. Spaced apart from apertures 30 circumferentially of wheel 26, and alternately positioned, are an equal number of apertures 32, as shown in Fig. 2 of the drawings. Apertures 32 are equally and oppositely tapered to apertures 30 and their minor diameter is equal to the major diameter of apertures 30, and they are spaced apart so that they also may receive bolts 22 when it is desired to turn wheel 26 around and mount it in outwardly dished relation. Such a mounting is shown in Fig. 3, where the frustoconical mounting nuts 31 seat against the cooperatingly tapered sides of apertures 32 to provide a wheel mounting similar to that shown in Fig. 1, except that nut 31 seats deeper in aperture 32 than in aperture 30, extending into recess 23, which it does not do when seated in aperture 30.

Wheel mounting nuts 31 may be provided having axial slots 35 extending the full axial length of each nut and from its outside surface to its internally threaded bore. The nuts are thus adapted to be threaded on the end of mounting bolts 22 and collapsed about the bolts as their tapered walls are forced into engagement with the tapered surfaces of apertures 30 and 32. When collapsed in assembled position the threads of the nuts have substantially complete engagement with the threads of bolts 22 and thus provide a non-loosening wheel mounting and inclined driving connection.

Nuts 31, instead of being tapped somewhat oversized for mounting bolts 22 so that they collapse when tightened, as has been described, may if desired be tapped a little undersized for the bolts, and the slots 35 will allow expansion in assembling and provide for a tight fit. In either case, it will be apparent that provision has been made for a secure, non-loosening mounting of wheels 26 with a simple and inexpensive construction and that bolts 22 may be the same for all positions about the vehicle, rather than right handed on one side and left handed on the other as is frequently the case for the purpose of secure mounting. It will further be apparent that the wheel provided is dished for desirable strength and may be mounted in the simple and secure manner indicated in either outwardly or inwardly dished position without any change in the wheel construction or addition of parts.

Referring to Fig. 4 of the drawings, it is evident that two identical wheels embodying the invention may be mounted to form a dual wheel.

As shown, two identical wheels 26 and 26A are mounted on hub 14. Wheel 26 is mounted in the inboard position on bolts 22 by its apertures 30 exactly as it is mounted on bolts 22 in Fig. 1. Wheel 26A is mounted in the outboard position by its apertures 32 on bolts 22 exactly as it is mounted on bolts 22 in Fig. 3. Nut 31 seats in the inboard and outboard wheels of the dual wheel assembly exactly as it seats in them respectively when mounted singly, that is to say, the axially outer half of the tapered portion of nut 31 engages aperture 32 of the outboard-mounted wheel in Figs. 3 and 4 and the axially inner half of the tapered portion of the nut engages apertures 30 of the inboard-mounted wheel in Figs. 1 and 4. Fig. 4 further shows that the apertures 30, 32, when placed in juxtaposition and axial alignment jointly constitute a straight sided and smooth composite seat for the nut 31. Such advantage arises from the fact that two series of circumferentially alternately located apertures exist in each of the identical wheels. The web of the wheel being considered as displaced from the center thereof axially, the apertures of one series are tapered on an inwardly diminishing and outward facing taper, while the apertures of the other series are complementary thereto in the sense that they are inward facing, of equal inclination, and adapted to constitute a continuation of the apertures of the first series by being equal in their minor diameter to the major diameter of the apertures of the first series.

There is thus provided a secure and simple mounting for the strong dished wheels 26 and 26A and the wheels are duplicates so that a single spare may be mounted in any position about the vehicle. While the vehicle wheels have been shown as applied to non-steering axles, they may, of course, be used singly or in pairs at the ends of the front or other steering axles.

The invention in its broader aspects is not limited to the specific mechanism shown and described but departures may be made therefrom within the scope of the accompanying claims without departing from the principles of the invention and without sacrificing its chief advantages.

What I claim is:

1. A vehicle wheel comprising a dished web having a plurality of circumferentially spaced apart tapered apertures therein each aperture being oppositely tapered to the apertures on either side thereof the minor diameters of the apertures facing in one direction being equal to the major diameters of the apertures facing in the other direction.

2. A vehicle wheel comprising a dished web having a plurality of circumferentially spaced apart tapered apertures therein each aperture being oppositely tapered to the apertures on either side thereof and alternate apertures being similarly tapered the minor diameters of the apertures facing in one direction being equal to the major diameters of the apertures facing in the other direction.

3. A vehicle wheel comprising a dished web having two series of alternately positioned circumferentially spaced apart apertures therein each series being so spaced as to receive the same set of wheel mounting bolts, all of said apertures having tapered walls the apertures of one series being equally and oppositely tapered to the apertures of the other series and having minor dimensions equal to the major dimensions of the apertures of said other series.

4. A vehicle wheel comprising a dished web having two series of alternately positioned circumferentially spaced apart apertures therein each series being so spaced as to receive the same set of wheel mounting bolts, all of said apertures having tapered walls and the apertures of each series being equally and oppositely tapered to those of the other series and adapted to constitute continuations of the tapers of the other series when juxtaposed and axially aligned therewith.

5. A vehicle wheel for mounting on a vehicle hub having a plurality of axially extending wheel mounting bolts mounted thereon, comprising a dished annular web having a number of apertures circumferentially spaced apart adjacent its inner periphery equal to double the number of said mounting bolts and adapted to receive said bolts through alternate apertures, each aperture being equally and oppositely tapered with respect to the apertures on either side thereof and complementarily dimensioned with respect thereto so as to constitute a continuation of the taper thereof when juxtaposed and alined axially thereof adjacent a similar wheel, said alternate apertures being adapted to receive frusto-conically formed mounting nuts threaded on the bolts, whereby the wheel may be mounted in inwardly or outwardly dished position on said bolts by said nuts.

6. A vehicle wheel for mounting on a vehicle hub having a plurality of axially extending wheel mounting bolts mounted thereon, comprising a dished annular web having a number of apertures circumferentially spaced apart adjacent its inner periphery equal to double the number of said mounting bolts and adapted to receive said bolts through alternate apertures, successive apertures being tapered in opposite directions the minor dimensions of alternate of said apertures being equal to the major dimensions of the other of said apertures.

7. A vehicle wheel to be mounted on a vehicle hub having a plurality of axially extending wheel mounting bolts by means of conical nuts cooperable with said bolts, comprising a dished annular web having a number of circumferentially spaced tapered apertures equal to double the number of said mounting bolts and adapted to receive said bolts through alternate apertures, each said aperture being tapered oppositely but with equal inclination to the apertures on either side and the minor diameter of one series of alternate apertures being equal to the major diameter of the other series of alternate apertures, whereby said web may be mounted alone inwardly or outwardly dished or in pairs oppositely dished upon said hub by means of said bolts.

8. A vehicle wheel capable of being mounted individually or in oppositely dished pairs on a vehicle hub having a plurality of axially extending wheel mounting bolts by means of conical nuts cooperable with said bolts, comprising a dished annular web having a number of circumferentially spaced tapered apertures equal to double the number of said mounting bolts and adapted to receive said bolts through alternate apertures, each said apertures being tapered oppositely but with equal inclination to the apertures on either side and the minor diameter of one series of alternate apertures being equal to the major diameter of the other series of alternate apertures.

CHARLES S. ASH.

REFERENCES CITED

The following references are of record in the file of this patent:

UNITED STATES PATENTS

| Number | Name | Date |
|---|---|---|
| 1,329,527 | Keegan | Feb. 3, 1920 |
| 2,195,589 | Eksergian | Apr. 2, 1940 |